United States Patent
Olsen et al.

(10) Patent No.: US 10,387,365 B2
(45) Date of Patent: Aug. 20, 2019

(54) METHOD AND SYSTEM FOR HIGH PERFORMANCE REAL TIME PATTERN RECOGNITION

(71) Applicant: Fermi Research Alliance, LLC, Batavia, IL (US)

(72) Inventors: Jamieson T. Olsen, Batavia, IL (US); Tiehui Ted Liu, Naperville, IL (US); James R. Hoff, Wheaton, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 0 days.

(21) Appl. No.: 15/737,151

(22) PCT Filed: Jun. 17, 2016

(86) PCT No.: PCT/US2016/038006
§ 371 (c)(1),
(2) Date: Dec. 15, 2017

(87) PCT Pub. No.: WO2017/039781
PCT Pub. Date: Mar. 9, 2017

(65) Prior Publication Data
US 2019/0012293 A1 Jan. 10, 2019

Related U.S. Application Data

(60) Provisional application No. 62/181,040, filed on Jun. 17, 2015.

(51) Int. Cl.
*G06F 15/173* (2006.01)
*H04B 10/80* (2013.01)
*G06F 15/76* (2006.01)
*G06K 9/62* (2006.01)
*H04B 10/40* (2013.01)

(52) U.S. Cl.
CPC ........ *G06F 15/17387* (2013.01); *G06F 15/76* (2013.01); *G06K 9/62* (2013.01); *H04B 10/40* (2013.01); *H04B 10/801* (2013.01); *G06F 2015/768* (2013.01)

(58) Field of Classification Search
CPC .............. G06F 15/17387; G06F 15/76; G06F 2015/768; G06K 9/62; H04B 10/40; H04B 10/801
See application file for complete search history.

(56) References Cited

U.S. PATENT DOCUMENTS

| | | |
|---|---|---|
| 2004/0221084 A1 | 11/2004 | Yates et al. |
| 2006/0129722 A1 | 6/2006 | Campbell |
| 2006/0218329 A1 | 9/2006 | DeNies et al. |

(Continued)

OTHER PUBLICATIONS

Olsen, J. et al., A Full Mesh ATCA-based General Purpose Data Processing Board, Journal of Instrumentation (2014) vol. 9, 8 pages.

*Primary Examiner* — Glenn A. Auve
(74) *Attorney, Agent, or Firm* — Kevin Soules; Luis M. Ortiz; Kermit D. Lopez

(57) ABSTRACT

Systems and methods supporting high performance real time pattern recognition by including time and regional multiplexing using high bandwidth, board-to-board communications channels, and 3D vertical integration. An array of processing boards can each be coupled a rear transition board, the array achieving time and regional multiplexing using high bandwidth board-to-board communications channels and 3D vertical integration.

14 Claims, 12 Drawing Sheets

(56) References Cited

U.S. PATENT DOCUMENTS

2007/0230148 A1 10/2007 Campini et al.
2010/0296820 A1 11/2010 Kuo et al.
2013/0286815 A1 10/2013 Tregenza Dancer

METHOD AND SYSTEM FOR HIGH PERFORMANCE REAL TIME PATTERN RECOGNITION

CROSS REFERENCE TO RELATED APPLICATIONS'

This application is the US national phase of International Application No. PCT/US2016/038006, filed on Jun. 17, 2016 under the PCT (Patent Cooperation Treaty), and claims priority to U.S. Provisional Patent Application No. 62/181,040, filed Jun. 17, 2015. The entire contents of these applications are incorporated herein by reference.

STATEMENT OF GOVERNMENT RIGHTS

The invention described in this patent application was made with Government support under the Fermi Research Alliance, LLC Contract Number DE-AC02-07CH11359 awarded by the U.S. Department of Energy. The Government has certain rights in the invention.

TECHNICAL FIELD

Embodiments are generally related to the field of electronics, data processing, and pattern recognition. Embodiments are related to methods and systems for integrating electronic systems, modules, and components. Embodiments are further related to methods and systems enabling high performance processing of data (e.g., rapid pattern recognition) with time and regional multiplexing using high bandwidth, board-to-board communications channels. Embodiments are further related to pattern recognition via 3D vertical integration.

BACKGROUND

Innovative new technologies have expanded the opportunities for experiments searching for rare physical phenomenon. In physics, for example, these efforts are limited by the challenges of fast pattern recognition in triggering as particle detector hit densities increase with the high luminosities required to produce rare processes. Thus, many next-generation scientific experiments will be characterized by the collection of huge quantities of data, taken in rapid succession. Scientists will be tasked with unraveling the underlying physical processes. In most cases, large background hits will overwhelm the interesting detections related to the relevant physical phenomena. The quantity of data that can be stored for later analysis is limited. Therefore, real-time event selection is imperative to evaluating the relevant events while ignoring background detection.

A particular example of this is in high-energy physics, where scaling of current technologies is unlikely to satisfy the scientific needs of future projects. Investments in transformational new technologies need to be made, for example, in support of the silicon-based tracking trigger for the High Luminosity Large Hadron Collider (HL-LHC). The development of the silicon-based L1 tracking trigger system is critically important for the HL-LHC. The high occupancies anticipated at the HL-LHC and the low latencies required at L1 present a formidable set of challenges. Among these are the complex data dispatching, pattern recognition, and track fitting.

Data dispatching involves hits from many thousands of silicon modules that must be organized and delivered to an appropriate trigger. Due to the finite size of a beam's luminous region in the z direction and the finite curvature of charged particles in the magnetic field, some hits must be duplicated and sent to multiple triggers in an intelligent way. In addition, all of this must be done within a very short time (on the order of a micro-second). Thus, communication among processing elements in different trigger locations requires very high bandwidth and very low latency. In addition, extremely fast and effective pattern recognition and track fitting is also required. The bandwidth to bring all the incoming data from the massive silicon detector reaches to 100 Terabytes per second, and for every 25 nanosecond (i.e., beam crossing rate at 40 MHz) all the tracks from each beam crossing (with, on average, 140 interactions per crossing) will need to be fully reconstructed out of an ocean of background hits. Therefore, High Luminosity LHC requires advanced real time data processing technology.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide a method and system for rapid data processing, including but not limited to patter recognition. High performance, real time data processing is supported by including time and regional multiplexing using high bandwidth board-to-board communications channels. High performance pattern recognition is enabled by the high speed data processing and significantly enhanced 3D vertical integration.

It is another aspect of the disclosed embodiments to provide a method and system which is fully scalable, abundant and flexible, non-blocking, that provides high bandwidth, board-to-board communication channels, to allow for high performance processing of data with both time and regional multiplexing. This can include a novel full mesh enabled field programmable gate array (FPGA) based Advanced Telecommunications Computing Architecture (ATCA) board, which can serve as a platform to implement the architecture and also as carrier for pattern recognition engines.

It is yet another aspect of the disclosed embodiments to provide an enhanced methods and systems for implementing powerful hardware pattern recognition algorithms (PRAM or Pattern Recognition Associative Memory) using 3D Vertical Integration technology (VIPRAM, or Vertically Integrated PRAM).

The aforementioned aspects and other objectives and advantages can now be achieved as described herein. A method and system supporting high performance real time data processing comprises an array of processing boards, and a rear transition board coupled to each of the processing boards, the coupling and array achieving time and regional multiplexing using high bandwidth board-to-board communications channels and 3D vertical integration for pattern recognition. In an embodiment, the processing boards incorporate a full-mesh architecture permitting high bandwidth, inter-board communication. The processing boards conform to advanced telecommunications computing architecture specification standards. The system further comprises a backplane configured to time-multiplex a high volume of incoming data in a manner that manages input and output demands of the system. The system can further comprise at least one mezzanine card. The at least one mezzanine card can further comprise a field programmable gate array, a pattern recognition application specific integrated circuit, and a plurality of fiber optic transceivers. In an embodiment, the at least one track processing engine is operably connected to the field programmable gate array. In an embodiment, the system further comprises at least one through silicon via connecting a plurality of two dimensional integrated circuits configured on at least one of the mezzanine cards in order to provide pattern recognition associative memory for identifying track patterns according to the 3D vertical integration.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
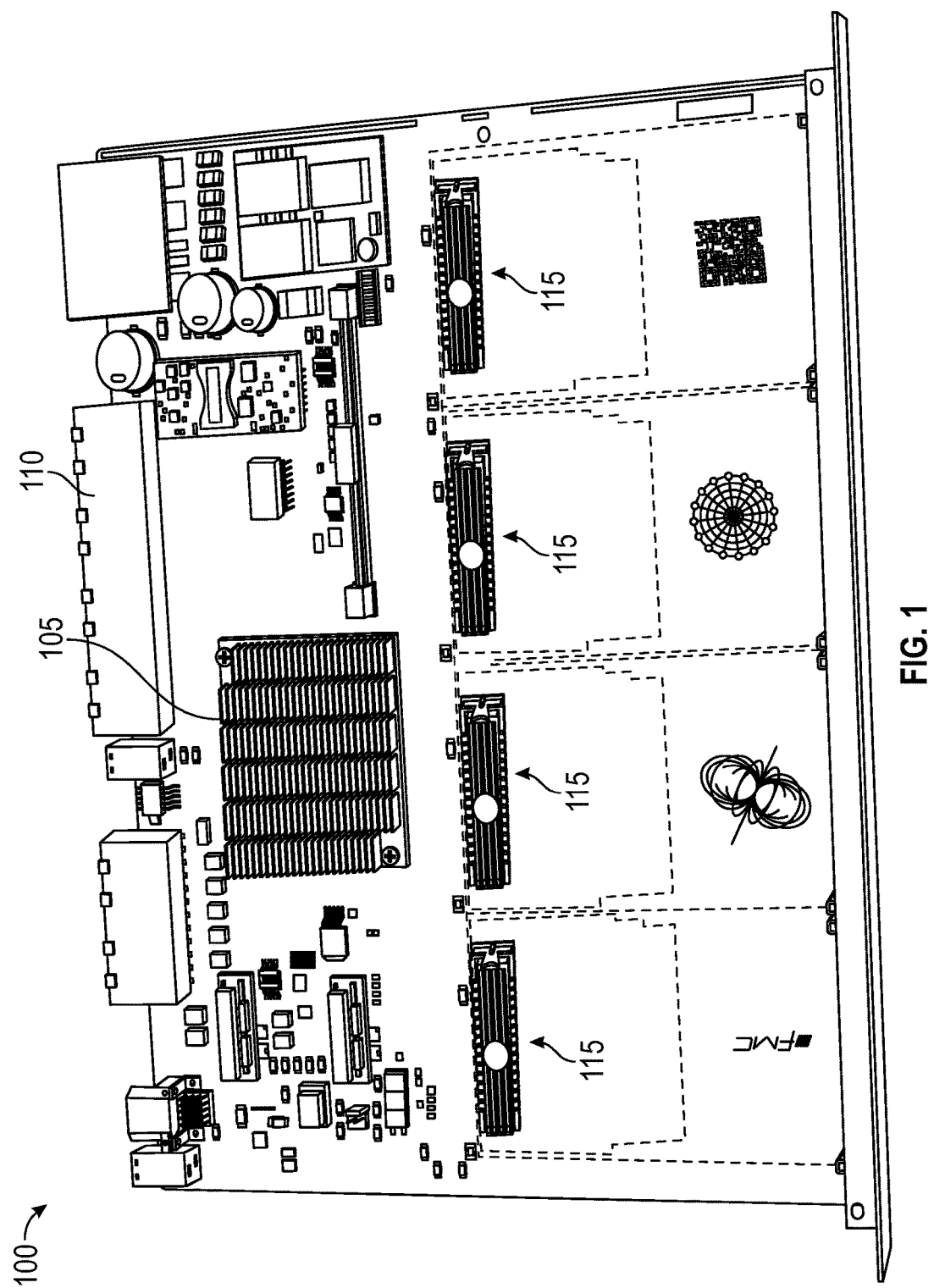
FIG. 1 illustrates the processing board, in accordance with features of the embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference to particle physics as an application is only for illustrative purposes and is not meant to limit the field of application for the present invention. Tracking triggers are utilized in particle physics. CMS L1 tracking trigger is a specific tracking trigger. Processing each beam crossing at CMS L1 tracking trigger implies not only finding and fitting tracks from a collection of Pt "stubs" (hit pairs), but also continuously reading out the stubs at 40 MHz. The system needs to process 40 million beam crossings per second with a maximum latency on the order of few microseconds. The total bandwidth required to transfer the stub data is on the order of 50-100 Tb/s and the total raw computational power needed to perform the track finding is huge, several orders of magnitude larger than what has ever been used for L1 triggering.

The embodiments disclosed herein provide a system utilizing massive parallelism by processing, in parallel, different crossings coming at different times (time multiplexing) and different regions of the detector(s) for the same crossing (regional multiplexing). In such a parallel system, a significant problem to be solved is how to dispatch the right data to the right processors. Data from the same crossing, coming from different detector elements, must be assembled and delivered to the same processing unit for track reconstruction. Data from different crossings, coming from the same detector element, must be delivered to different processing units for optimal time multiplexing. The subdivision of the detector into geographical towers does not lead to an exact corresponding subdivision of the track parameter space. Data coming from a given geographical trigger tower may need to be delivered to multiple parameter space regions. This can happen, in particular, when a stub comes from a detector element close to the border between geographical trigger towers, due to the finite curvature of charged particles in the magnetic field and finite size of the beam luminous region along the beam axis.

For the reasons stated above, the design of the overall architecture for CMS L1 tracking trigger has been focused on the need for efficient dispatching of the data for time and regional multiplexing and on the ability to provide a common flexible framework to implement different pattern recognition algorithms. The efficient data dispatching for time and regional multiplexing requires high bandwidth, low latency, and flexible real time communication among processing nodes. For this reason, the embodiments disclosed herein include a full mesh backplane based hardware platform.

In an embodiment, a custom full mesh enabled processing board is disclosed which provides a scalable architecture abundant in flexible, non-blocking, high bandwidth board-to-board communication channels. In addition, a pattern recognition mezzanine card provides the pattern recognition engine, which can host a powerful FPGA and the associative memory chips being developed at Fermilab (for CMS L1) or simply a few FPGAs in the case of alternative pure FPGA-based algorithms.

The full-mesh architecture of a designed processing board disclosed herein permits high bandwidth, inter-board communication. The processing board can conform to ATCA specification standards. The ATCA specification was designed by the telecommunications industry and thus strong emphasis has been placed on reliability and high availability; the present design embraces these ideas by fully supporting the Intelligent Platform Management Interface (IPMI) protocol. The full-mesh backplane is used to time-multiplex the high volume of incoming data in a way such that I/O demands are manageable at the board and chip level. This is achieved by having FPGAs directly connected to the full-mesh backplane without the use of commercial network switch devices. The detector can be divided into 48 angular regions (6 in $\eta$ times 8 in $\phi$), which can be referred to as "trigger towers". Multiple processing engines can be assigned to each trigger tower so that data from a particular trigger tower from different crossings may be processed in parallel. This architecture is open, scalable, and flexible. A major advantage of having FPGAs directly connected to the full mesh backplane is that it effectively blurs the distinction between boards, thus enabling system architects to experiment with different shelf configurations.

Referring to FIG. 1, a processing board 100 (or ATCA front board) is illustrated. The processing board 100 can be referred to as an ATCA board because it can conform with Advanced Telecommunications Computing Architecture specifications, and because it can be designed around a single large Field Programmable Gate Array (FPGA) 105. This FPGA 105 can feature many high-speed serial transceivers, which can be directly connected to the full mesh backplane and to fiber optic transceivers on a rear transition module (RTM). The connection can comprise backplane fabric data connectors 110. The full mesh backplane enables FPGAs 105 to communicate directly, using robust, light-weight serial protocols, thus avoiding latency penalties, bottlenecks, and complex protocols associated with conventional network switch devices. Currently, prior art ATCA backplanes are rated for up to 40 Gbps per bidirectional channel. Embodiments disclosed herein provide backplanes rated for up to 100 Gbps per channel. Mezzanine card connectors 115 are also provided on the ATCA board to receive and connect with mezzanine cards.

Figure 2:
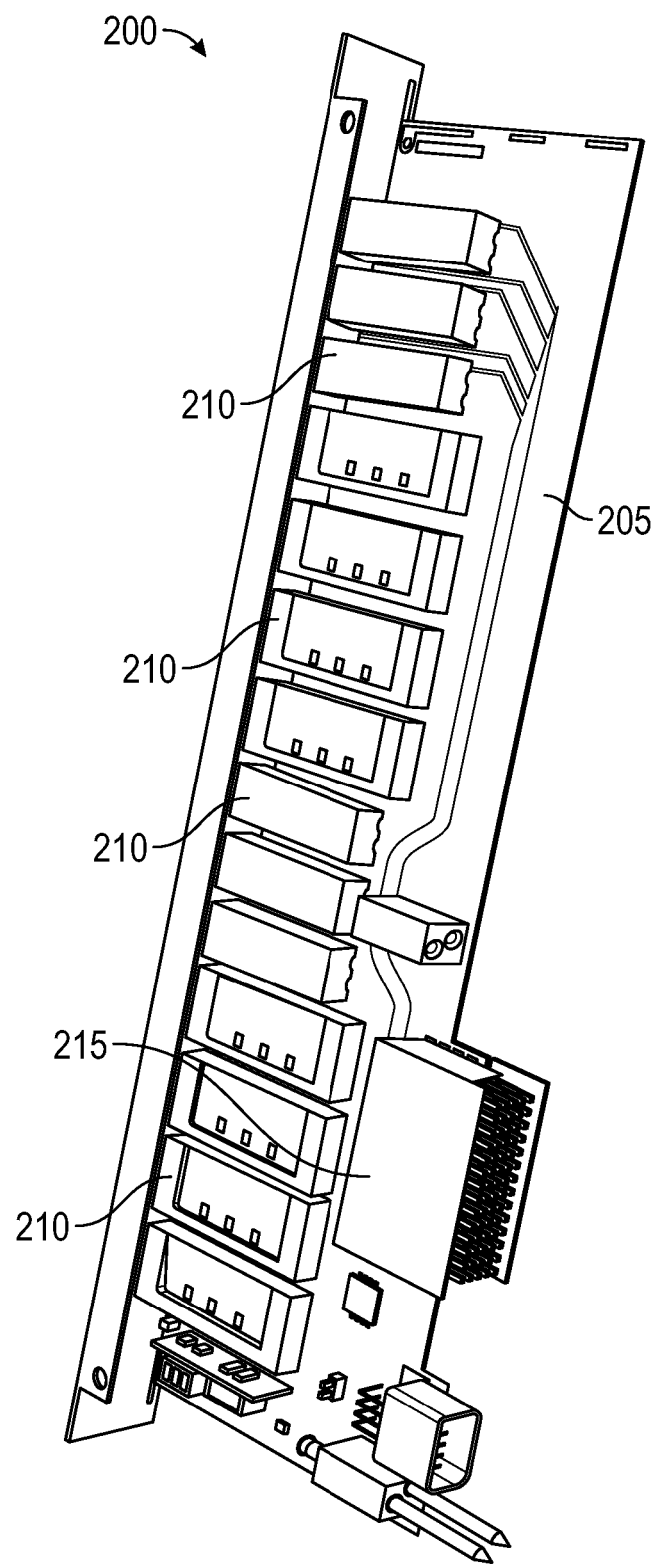
FIG. 2 illustrates the rear transition board, in accordance with features of the embodiments.

Referring to FIG. 2, illustrated is a rear transition module (RTM) 200 including an RTM board 205, which can include ingress and egress data ports. Each RTM board 205 can support up to ten quad small form factor pluggable fiber optic transceivers (QSFP+) 210. When fully loaded with QSFP+ transceivers, the RTM board 205 can support data rates of up to 400 Gbps in each direction. The RTM board 205 can conform to the PICMG 3.8 standard and can be considered an intelligent, hot swappable "field replaceable unit" (FRU). Also shown is the data connector board 215, which interfaces with the ATCA board 100 described with respect to FIG. 1.

Figure 3:
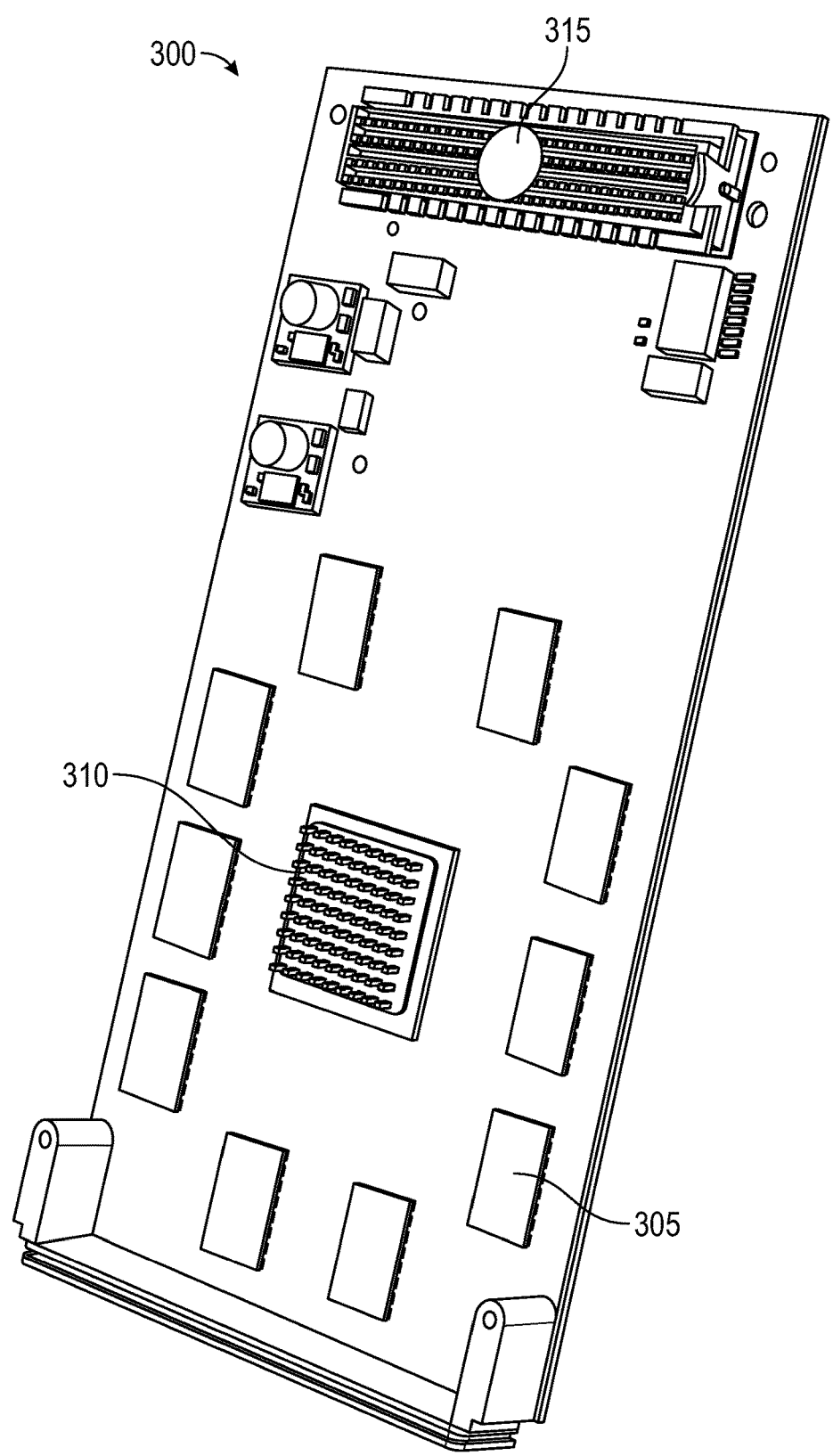
FIG. 3 illustrates a mezzanine card with one FPGA and multiple PRAM pattern recognition units, in accordance with features of the embodiments.
Figure 4:
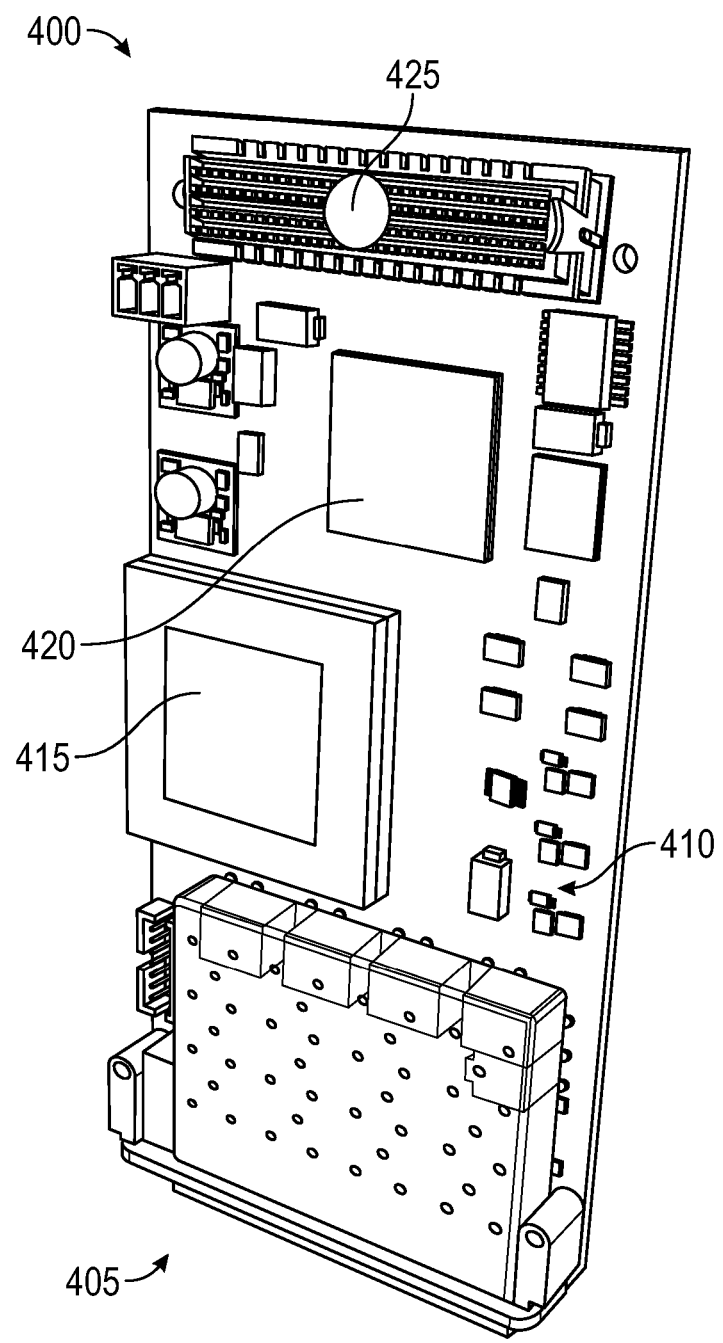
FIG. 4 illustrates another mezzanine with one FPGA and single PRAM pattern recognition unit, in accordance with features of the embodiments.

FIG. 3 and FIG. 4 show mezzanine card 300 and mezzanine card 400, respectively. Mezzanine card 300 and mezzanine card 400 can conform to the FPGA Mezzanine Card (FMC) standard. The mezzanine cards can contain FPGAs, pattern recognition ASICs, fiber optic transceivers, or any other custom hardware useful in carrying out data processing in accordance with aspects of the present invention.

FIG. 4 illustrates a single wide mezzanine card 400 with a single VIPRAM 415, FPGA 420, and mezzanine connector 425 to interface with the ATCA board 100. In an embodiment, the mezzanine card 400 can feature a Xilinx Kintex-7 FPGA, four SFP+ pluggable optical transceivers 405, voltage regulators 410, DDR3 memory, and a socket used for testing custom ASIC chips. In an embodiment, the mezzanine card 400 serves primarily to test pattern recognition associative memory devices.

In alternative embodiments, mezzanine card designs can feature larger, more powerful FPGAs and will support multiple PRAM ASICs. FIG. 3 illustrates such an alternative mezzanine card 300 that includes an array of PRAM ASICs 305, an FPGA 310, and a mezzanine card connector 315.

Figure 5:
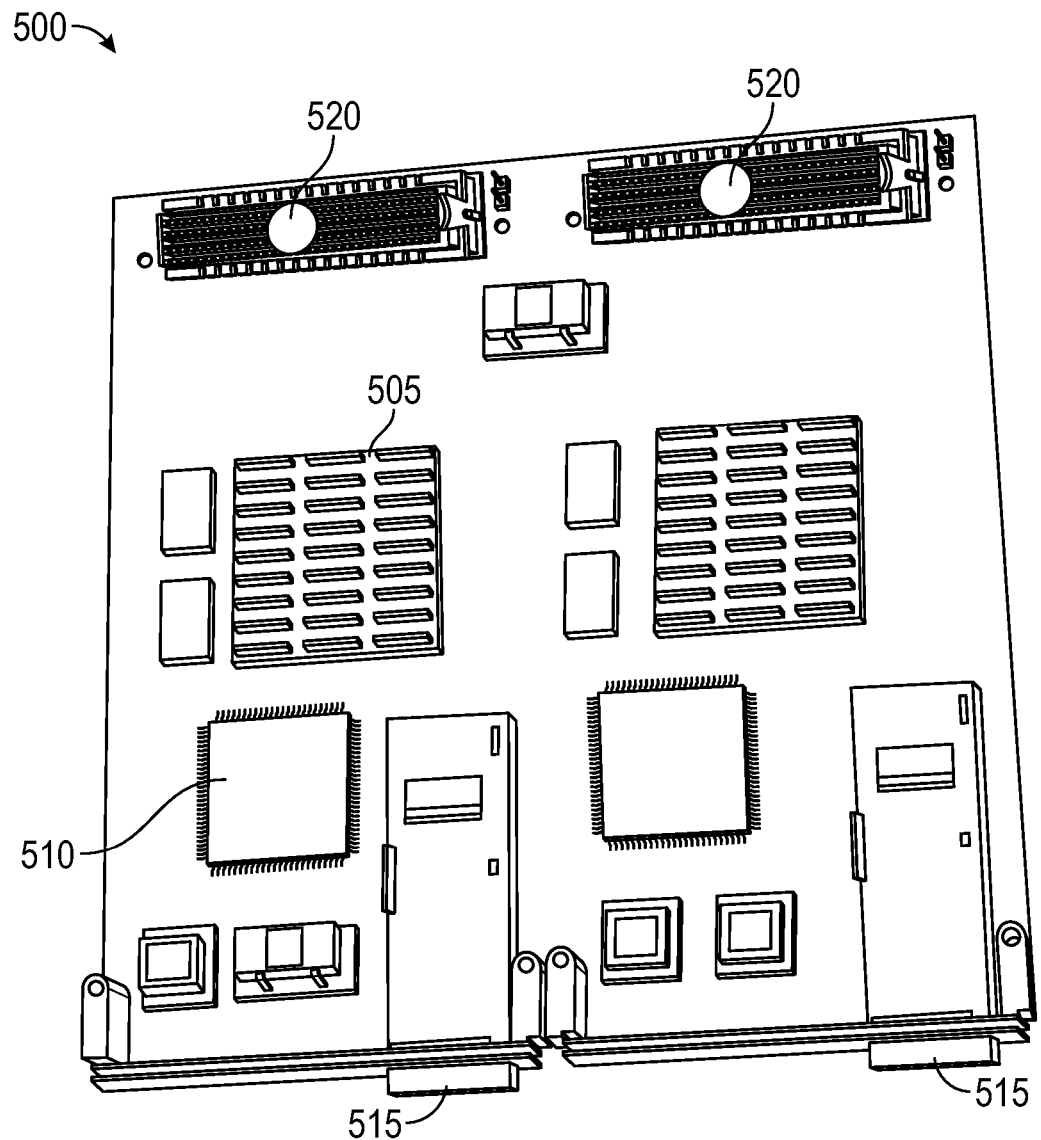
FIG. 5 illustrates a double-width mezzanine card with two FPGAs and two PRAM pattern recognition units, in accordance with features of the embodiments.

FIG. 5 illustrates an alternative embodiment comprising a doublewide mezzanine card 500 for use in related systems. The doublewide mezzanine card 500 includes a pair of large Xilinx UltraScale FPGA 505, a VIPRAM chip 510, fiber optic transceivers 515, and several mezzanine card connectors 520.

Figure 6:
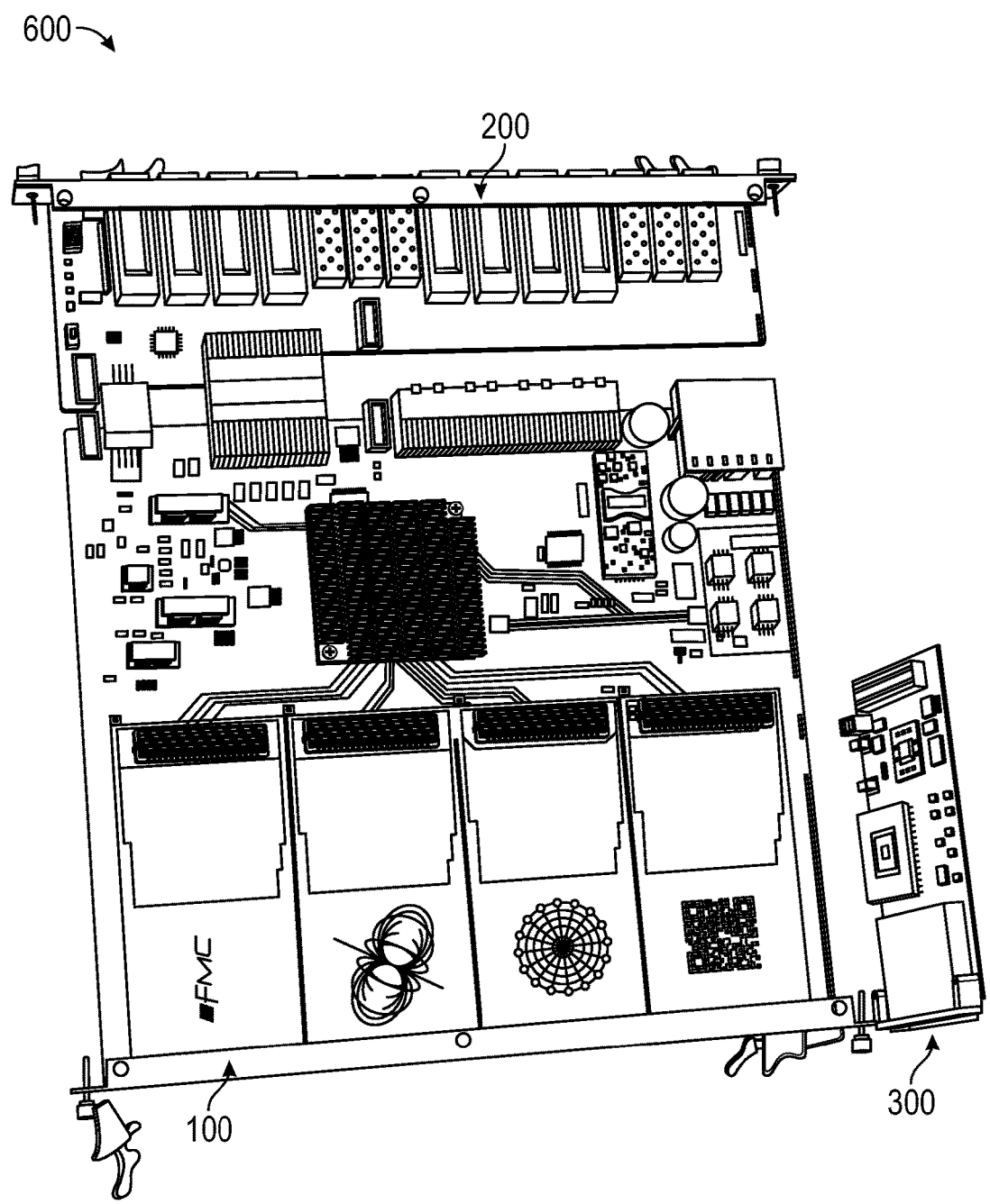
FIG. 6 illustrates a photograph of a front board connected to a rear transition board, together with a mezzanine card on the side, in accordance with features of the embodiments.

FIG. 6 illustrates a front board, such as front board 100 physically coupled (connected) to a rear transition module 200, and also shows a mezzanine card, such as mezzanine card 300 sitting unconnected, but next to the front board 100. These represent the three connectable components in a system 600, in accordance with teaching of the present invention.

Figure 7:
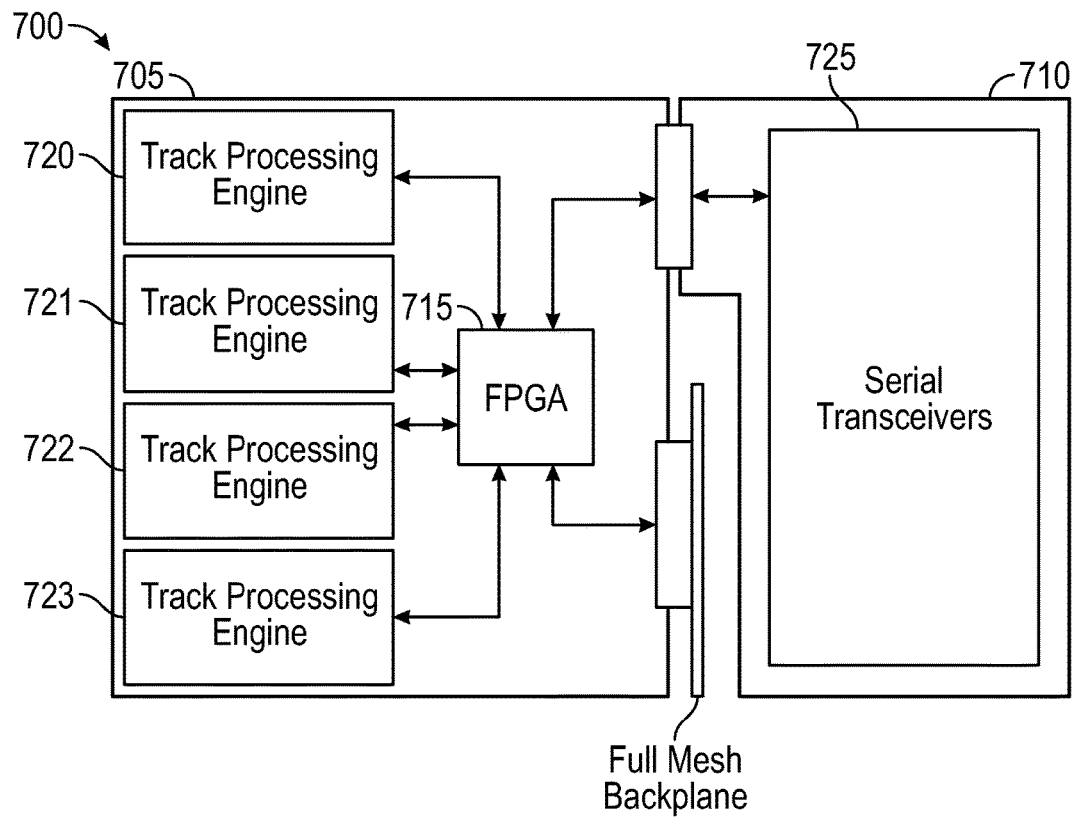
FIG. 7 illustrates a block diagram of modules (track processing engines) that can be included when a front board is connected to a rear transition board, in accordance with features of the embodiments.

FIG. 7 illustrates a block diagram of a system 700 of modules that can be provided when the front board and rear transition module are connected. A front board 705 is connected by connectors to a rear transition module 710. The front board 705 has a FPGA 715 connected to track processing engines 720-723. The FPGA 715 communicates directly with serial transceivers 725 located on the rear transition module 710 via the connectors.

Embodiments disclosed herein may take advantage of the Pattern Recognition Associative Memory (PRAM) principle which can be utilized in the field of particle physics to identify particle track patterns efficiently in real time. In certain embodiments, PRAM can be used to rapidly identify track patterns by matching candidate detector address patterns (hits) to a set of pre-calculated hit patterns and simultaneously associating those hits across different tracking detector layers and thereby extracting tracks from a noisy, chaotic dataset. The PRAM approach uses a massively parallel architecture to tackle the intrinsically complex combinatorics of track finding algorithms, avoiding the typical power law dependence of execution time on occupancy and solving the pattern recognition in times roughly proportional to the number of hits. Such a system is not limited to High Energy Physics, but rather is applicable to any high speed pattern recognition system attempting to screen for sets of quantifiable observables—sets of numbers, data mining, gene sequences, etc.

PRAM operation can be best described using an analogy to a game of high-speed Bingo. The stored patterns are the players' "Bingo Cards". The candidate patterns are the numbers on the balls called out by the game's Master of Ceremonies—A1, B2, etc. To continue with the analogy, individual CAMs are programmed to match a particular number. That particular number can exist in more than one "row" on a player's Bingo Card. A particular number will NOT, however, exist in more than one "column". The PRAM concept further refines the Bingo Game by declaring that each column comes from a different detector layer or category and that these different categories are exclusive. As expected, a flag can be raised when one entire row is satisfactorily activated. Perfect row matches and slightly imperfect row matches are possible in the PRAM system.

As another example, consider the challenge of trying to match the description of a person. Column 1 might be "Hair color". Column 2 might be "Weight". Column 3 might be "Shoe size". First, the exclusive nature of the columns is immediately obvious. It is necessary to match candidate "Hair color" versus the stored "Hair color" patterns. There is no point in comparing "Hair Color" to "Weight". The comparison is meaningless. Finally, only when a candidate has the right "Hair Color", "Weight", "Eye Color", "Nose Length", etc., is a candidate flagged as a match. It is also possible that if all patterns are correct, but "Hair Color" alone is wrong, the user may still want this candidate flagged. This is a simplified example of the challenge which the present embodiments are designed to address in significantly more complex scenarios.

Figure 8:
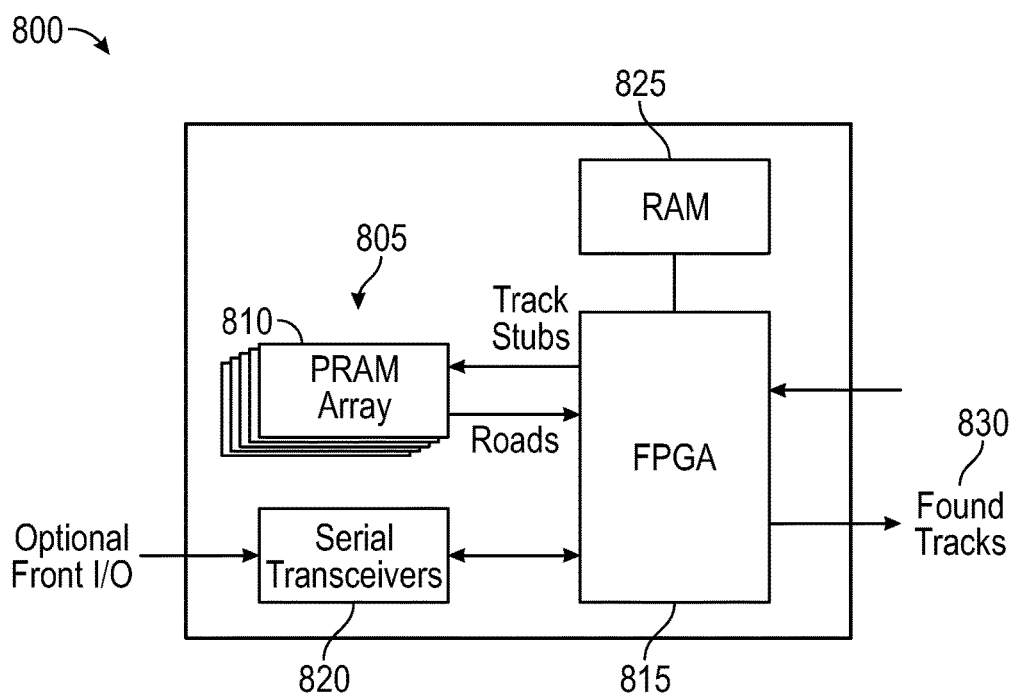
FIG. 8 illustrates a block diagram of components on the mezzanine card including a PRAM array, in accordance with features of the embodiments.

Referring to FIG. 8, a block diagram of system 800 is illustrated, with components including PRAMs 810 mounted on the mezzanine 805. PRAMs 810 can contain large arrays of smaller CAM cells arranged in associated groups called "patterns". The PRAM 810 array is connected to the FPGA 815. Serial transceivers 820 are also connected to the FPGA 815. RAM 825 can support the FPGA 815. Data enters the FPGA 815 from the front board 100 and the found tracks 830 can be returned to the front board 100. It is these patterns that are reproduced many times in a PRAM 810 and are ordered in a fashion that is periodic in space (two-dimensions in existing technologies).

Critical figures of merit for an associative memory based system are the number of predetermined patterns that can be stored, the number of patterns per unit area (pattern density), the speed, and the power consumption. At the system level, when a detector system is more complicated and/or has a higher hit occupancy (such as at the high luminosity LHC experiments at CERN), there is a need for many more patterns and/or more CAMs per pattern, for faster speeds and, at the same time, lower power consumption per pattern. However, at the chip level, when more detector layers/elements are involved, more CAM cells are needed to implement a given pattern and the layout is more spread out in two dimensions (for a given technology node) resulting in decreasing pattern density and increasing parasitic load capacitance. This increased load capacitance results in increased power consumption and decreased speed. The fact that increasing the total number of patterns can work in opposition to both system speed and power consumption has been the main limitation of an otherwise powerful technique in particle physics. Likewise, this is the principal limitation in the application of this technique outside particle physics where pattern density and processing speed are needed.

The disclosed embodiments implement PRAM structures for fast pattern recognition applications using 3D integrated circuit (3DIC) technology. In the embodied 3DIC technology, sets of otherwise typically 2D integrated circuits are fitted with Through-Silicon Vias (TSVs) and Bonding Interfaces which allow these 2D integrated circuits to be stacked and interconnected into one structure that is effectively one monolithic three-dimensional integrated circuit. This technology requires deliberate and detailed geometric alignment of the various 2D integrated circuits (tiers), but at the same time, it frees the third dimension for design consideration. As such, the PRAM is almost an ideal candidate for the application of 3DIC design. Adding a third dimension this way opens the possibility for new architectures and layouts that could dramatically enhance the pattern recognition performance as well as flexibility far beyond the original 2D CAM-based associative memory approach. Stated simply, the embodiments disclosed herein ameliorate the inverse relationship between patter quantity and system speed and power consumption. In addition, the embodiments offer flexibility impossible to realize in two-dimensions. For simplicity, these 3D PRAM structures can be called VIP-RAM for Vertically Integrated Pattern Recognition Associative Memory.

Figure 9:
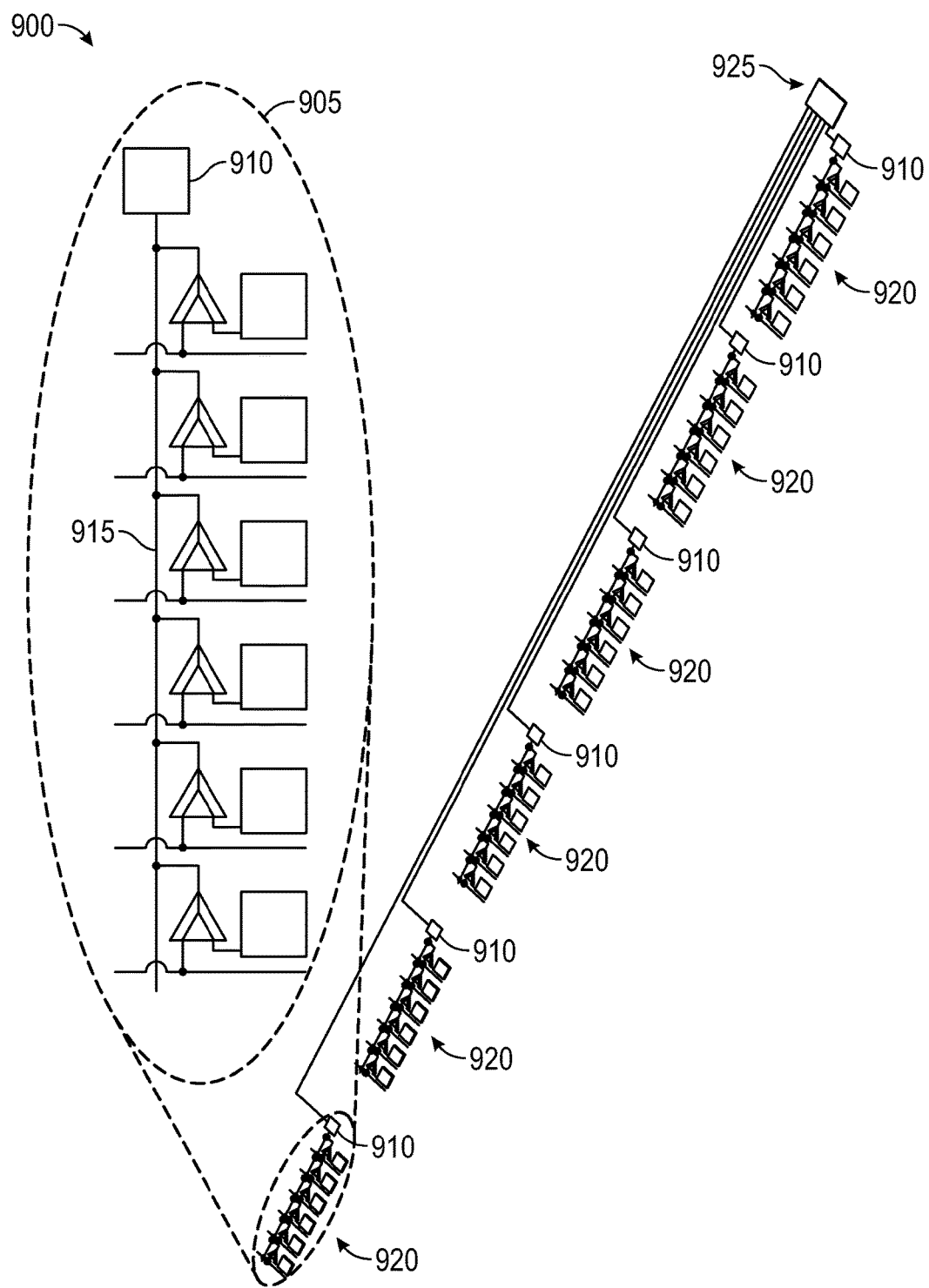
FIG. 9 illustrates diagrams of a PRAM cell, in accordance with features of the embodiments.

FIG. 9 is a block diagram of a Pattern Recognition Cell 900 assuming 6 detector layers each with 6 bits CAMs, in accordance with the disclosed embodiments. This is all the circuitry necessary for storing a pre-determined set of known patterns, for matching candidate hit address from a fixed set (6) of the detector layers against the pre-determined set of known patterns, for resolving, flagging, and holding the final pattern match. That is the pattern cell, a.k.a. the PRAM cell. It is that cell that can be made to grow or shrink with the number of layers/CAMs in the PRAM design and it is the cell that can be repeated many times and ordered in a fashion that is periodic. The CAM cell 905 includes match logic and match storage 910 with a CAM match line 915. As FIG. 9 illustrates individual or layer specific CAM cells 920 can be connected to a glue logic or majority logic 925 via the stored address match lines.

Figure 10:
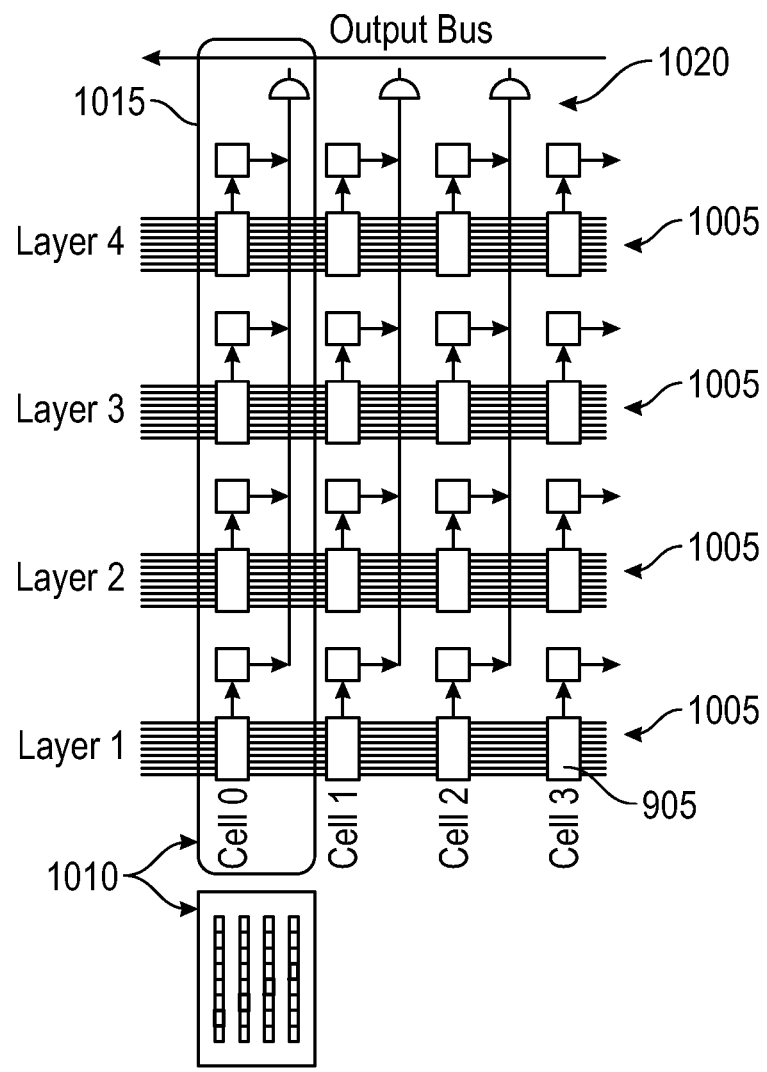
FIG. 10 illustrates an abstracted and generalized PRAM array.

FIG. 10 illustrates a highly abstracted PRAM array in a conventional 2 dimensional implementation. The columns 1015 are individual PRAM cells. The rows 1005 align CAM cells associated with the same detector layer across different PRAM cells. It should be understood that FIG. 10 illustrates cells 0-3 in layers 1-4. This is exemplary and other number of cells and layers may alternatively be used. As shown, one pattern 1010 can be provided to a CAM cell. A flip flop logic 1015 is provided before the pattern reaches majority logic 1020. The obvious symmetries in the 2 dimensional FIG. 10 can result in a great many different 3D architectures.

In a 3D embodiment, each separate CAM is moved to its own 3D tier and the Control Logic that monitors the road is moved to its own tier. To follow the Bingo analogy, each CAM is looking for a particular number on the ball from a particular layer. The Control Logic looks to see if its row is full and then raises a flag (or shouts "Bingo"). So, for an N-detector layer structure, this version requires N+1 3D tiers (N CAM tiers and one Control tier). It also requires inter-tier interconnections that allow the match from each CAM tier to be communicated up to the Control Tier. In another 3D embodiment, a given CAM tier can implement M detector layers, this version would require N/M+1 3D tiers (N/M CAM tiers and one Control tier).

Figure 11:
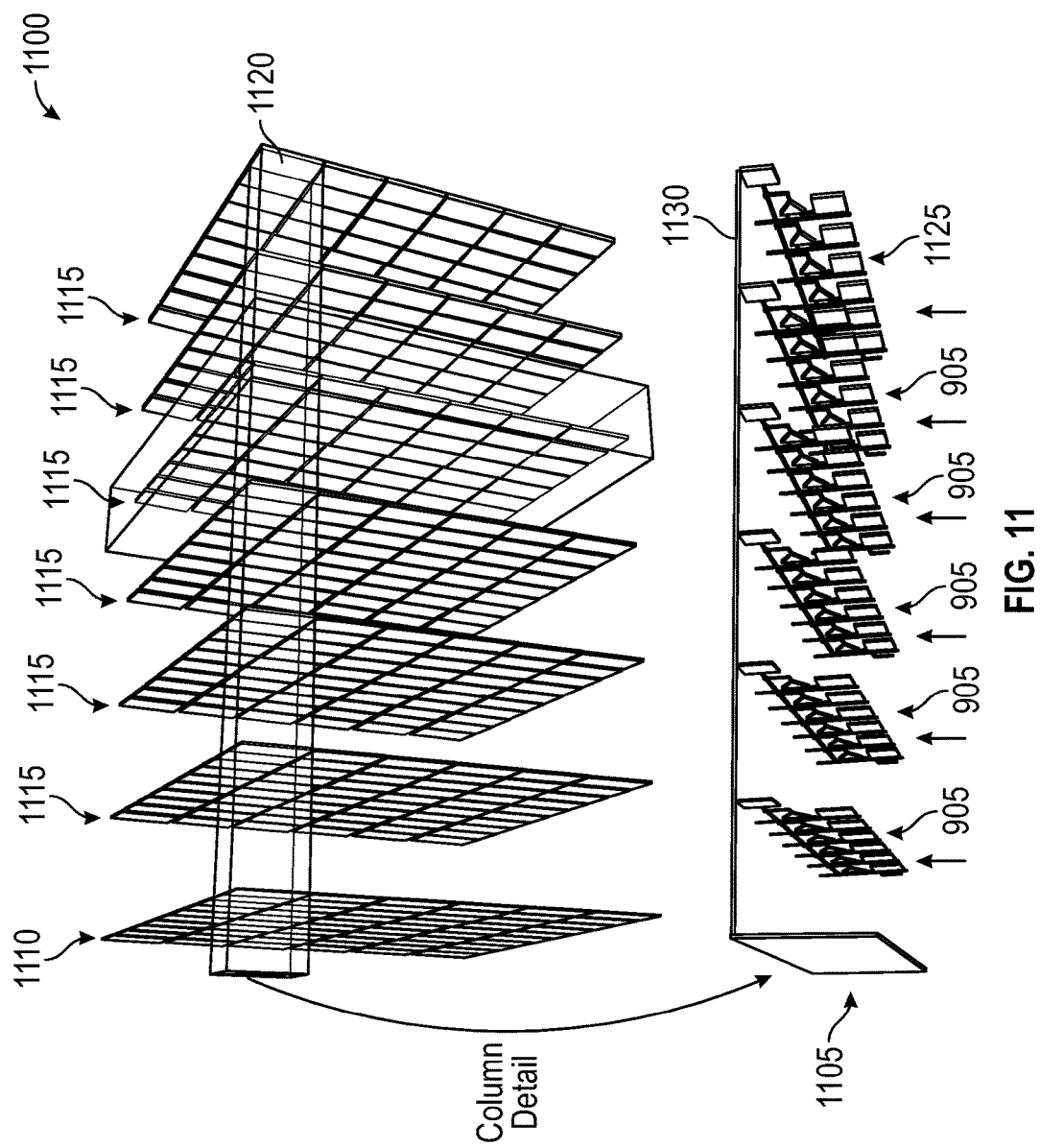
FIG. 11 illustrates a PRAM array vertically implemented with one vertically integrated PRAM cell highlighted, in accordance with features of the embodiments.

Referring to FIG. 11, a diagram of a 3D PRAM (or VIPRAM) column system 1100 is illustrated. The VIPRAM system 1100 can maximize 2-dimensional pattern density by completely separating the Control Logic 1105 onto its own tier and each detector layer CAM cells onto its own dedicated tier. At the same time, because the vertical interconnections (TSVs) between tiers are much shorter, and the footprint of each pattern is much smaller than in conventional 2D implementation, the power density will be minimized by the reduction of parasitical capacitance. In an embodiment, the system 1100 includes an I/O Tier 1110 and a plurality of CAM tiers 1115. The PRAM cell is built in column 1120. The CAM cells 905 in the Control logic 1105 include layer data busses 1125 and address match lines 1130.

The embodiment described above provides an area approximately equal to the area that once contained only one CAM word cell, a VIPRAM cell can process the L layers of a PRAM pattern (pattern density). This approach also means that the top tier of the VIPRAM now resembles a 2-dimensional array of signals that indicate whether or not a pattern has been flagged. The location of the flag in the 2-dimensional array is indicative of which pattern has been flagged. This approach directly shortens the longest of the lines in the road pattern recognition cell by shortening the Stored Address Match lines. As these lines are repeated throughout the chip, this has a significant impact on performance (power density and speed). At the same time, this approach makes the layout of the CAM cells, Majority Logic cells, as well as the input and the output busses simpler, more uniform and more efficient. In fact, the 3D architecture allows more freedom in the optimization of the 2D layout of the CAM and Majority Logic cells.

An alternative embodiment comprises placing 2 or more CAMs on each CAM tier, but otherwise does not alter them. The same number of inter-tier interconnects are required, but the required vertical stack is reduced.

Yet another embodiment is similar to the two versions just described, except it can place additional circuitry on the Control Tier to allow the Control Logic to ignore match signals from different CAM cells. This could allow configurable road cells, but at the expense of pattern density.

In another embodiment, the Control Logic is divided among the CAM tiers. One or more CAM cells can be placed on each CAM tier, but each tier has only a fixed number of interconnects between tiers which communicate the current state of the pattern. The state of the pattern could be "Perfect Match", "One Missing", "Two Missing", etc. With 4 interconnects between tiers, the state could be anything from "Perfect Match" to "Three or More Missing". If a particular tier has 1 CAM on it, and that CAM indicates a "MISS" and if the input to that tier was a "Perfect Match", then the output of that tier would be "One Missing". The top-most tier is no longer a Control Tier, but rather an 10 Tier whose sole purpose is to capture flags and get them output as necessary. This final version is the most configurable version discovered to date. It offers the possibility of pattern densities that are nearly as good as the first version. It is not nearly as constrained in size because new tiers can be added without affecting functionality. Minimal logic added to each CAM tier allows configurability, like the third version, without such a significant effect on pattern density because the logic is smaller as well as being distributed across all the CAM tiers. Like the first version, it only requires two mask sets. However, unlike the first version, additional mask sets in the last version discussed could allow almost endless scalability.

The embodiments permit the flow of VIPRAM's tasks to be divided into two broad categories: 1) Pattern Recognition Associative Memory (PRAM), and 2) input/output and control (IOC). The former consists of CAM Cells, Majority Logic Cells, and pattern and critical signal distributions. This was the focus of protoVIPRAM2D, a successful 2D prototype implementation of the 3D-compatible cells necessary for the final design. The IOC consisted of data input handling, slow control, road match capture, sparsification, and road output. During operation, silicon detector data is sent to the VIPRAM followed by a unique End-of-Event signal. Upon the arrival of the End-of-Event, the pattern match capture logic in the IOC snaps a picture of the state of the PRAM, freeing the PRAM to begin collecting data for the next event, if necessary. The captured pattern match-snap shot is sparsified, placed in a FIFO, serialized, and driven off-chip to the track fitting logic.

Figure 12:
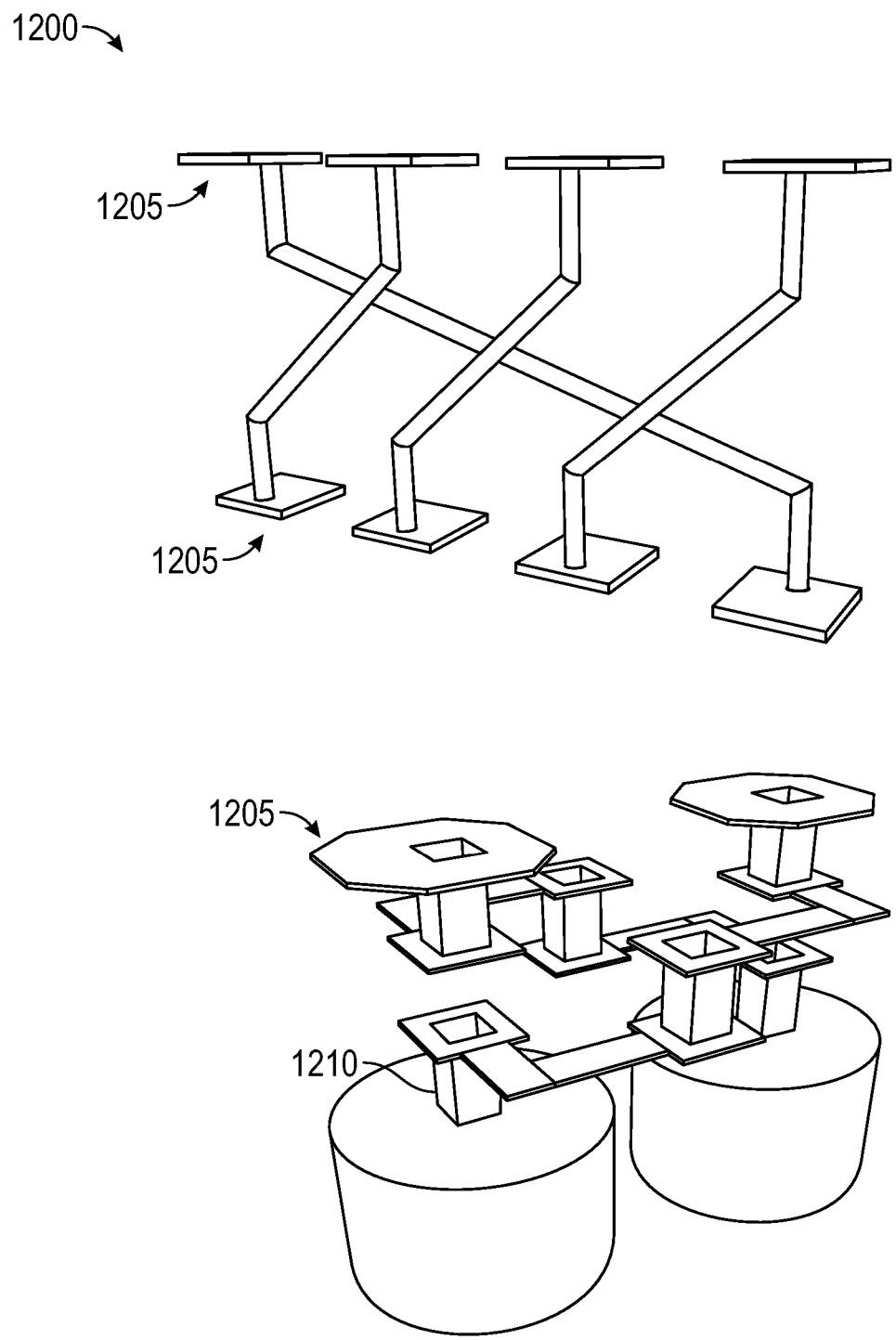
FIG. 12 illustrates connective vias that can be incorporated into the system design to interconnect tiers of the system, in accordance with features of the embodiments.
Figure 13:
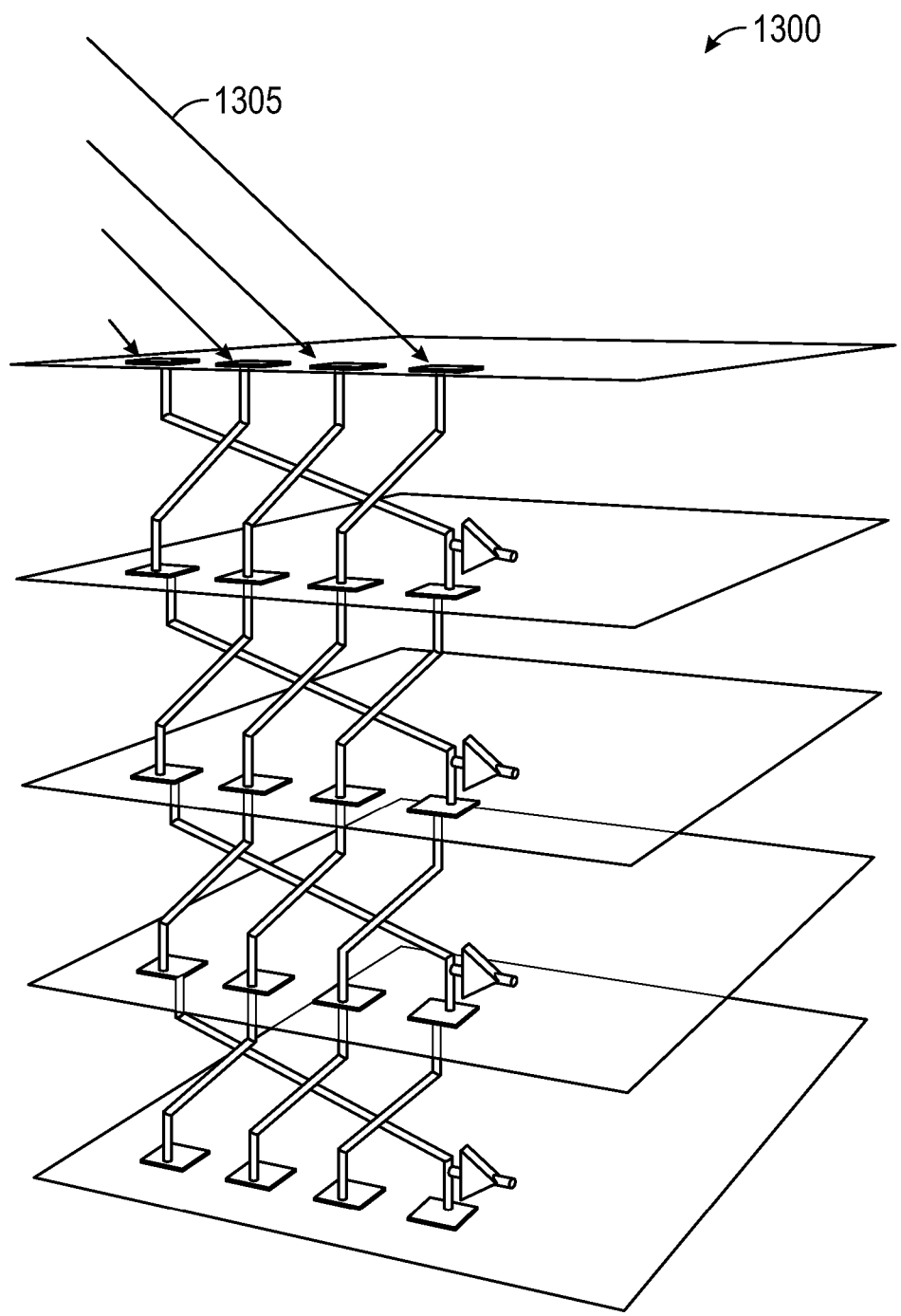
FIG. 13 illustrates connective vias that can be incorporated into the system design to interconnect tiers of the system, in accordance with features of the embodiments.

Referring to FIGS. 12 and 13, illustrated are connective vias that can be incorporated into the system design to interconnect components/tiers of the system. In particular, in FIG. 12 two tier diagonal vias 1200 are illustrated with pads 1205. Through silicon via 1210 is shown in the system architecture. FIG. 13 illustrates the paths 1305 of multi-tier diagonal vias 1300 through the various tiers of the system.

Based on the foregoing, it can be appreciated that a number of embodiments are disclosed herein, preferred and alternative. For example, in one embodiment, a system supporting high performance real time data processing, comprises an array of processing boards, a rear transition board coupled to each of the processing boards, said coupling and array achieving time and regional multiplexing using high bandwidth board-to-board communications channels.

In an embodiment, the processing boards incorporate a full-mesh architecture permitting high bandwidth, inter-board communication and wherein said processing boards conform to advanced telecommunications computing architecture specification standards.

In another embodiment, the system further comprises a backplane configured to time-multiplex a high volume of incoming data in a manner that manages input and output demands of the system.

In another embodiment, the system comprises at least one mezzanine card per processing board. The at least one mezzanine card further comprises a field programmable gate array, data processing circuitry, and a plurality of fiber optic transceivers. In an embodiment, the data processing circuitry comprises pattern recognition circuitry implemented in a field programmable gate array. In another embodiment, the data processing circuitry comprises pattern recognition circuitry implemented in a pattern recognition application specific integrated circuit.

In an embodiment, the system comprises at least one through silicon via connecting a plurality of two dimensional integrated circuits configured on at least one of said mezzanine cards in order to provide pattern recognition associative memory for identifying track patterns according to said 3D vertical integration.

In yet another embodiment, a data processing apparatus comprises an array of processing boards; a rear transition board coupled to each of the processing boards, said coupling and array achieving time and regional multiplexing using high bandwidth board-to-board communication channels. The processing boards incorporate a full-mesh architecture permitting high bandwidth, inter-board communication and wherein said processing boards conform to advanced telecommunications computing architecture specification standards.

In another embodiment, the apparatus further comprises a backplane configured to time-multiplex a high volume of incoming data in a manner that manages input and output demands of the apparatus.

The apparatus can comprise at least one mezzanine card per processing board. Said at least one mezzanine card further comprises a field programmable gate array, data processing circuitry, and a plurality of fiber optic transceivers. In another embodiment, the data processing circuitry comprises pattern recognition circuitry implemented in a field programmable gate array. In another embodiment, the data processing circuitry comprises pattern recognition circuitry implemented in a pattern recognition application specific integrated circuit.

In another embodiment, the apparatus comprises at least one through silicon via connecting said plurality of two dimensional pattern recognition integrated circuits configured on at least one of said mezzanine cards in order to provide pattern recognition associative memory for identifying track patterns according to said 3D vertical integration.

In yet another embodiment, a method for high performance real time data processing comprises configuring an array of processing boards; and coupling said array of processing boards in order to provide inter-board communication thereby achieving time and regional multiplexing using high bandwidth board-to-board communications channels.

In an embodiment, the method further comprises connecting a plurality of two dimensional pattern recognition integrated circuits vertically with at least one through silicon via, on at least one of mezzanine card, connecting said mezzanine card to said array of processing boards, and coupling a rear transition board to each of the processing boards, said coupling and array achieving said time and regional multiplexing using high bandwidth board-to-board communications channels and 3D vertical integration.

In an embodiment, the method comprises time-multiplexing a high volume of incoming data in a manner that manages input and output demands with a backplane. The method can further comprise identifying track patterns according to a 3D vertical integration.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system supporting real time data processing, comprising:
   an array of processing boards;
   a rear transition board coupled to each of the processing boards achieving time and regional multiplexing using board-to-board communications channels;
   at least one mezzanine card per processing board said at least one mezzanine card further comprising a field programmable gate array, data processing circuitry, and a plurality of fiber optic transceivers; and
   at least one through silicon via connecting a plurality of two dimensional integrated circuits configured on at least one of said mezzanine cards in order to provide pattern recognition associative memory for identifying patterns according to a 3D vertical integration.

2. The system of claim 1, wherein the processing boards incorporate a full-mesh architecture permitting, inter-board communication and wherein said processing boards conform to advanced telecommunications computing architecture specification standards.

3. The system of claim 1 further comprising a backplane configured to time-multiplex incoming data in a manner that manages input and output demands of the system.

4. The system of claim 1 wherein said data processing circuitry comprises pattern recognition circuitry implemented in a field programmable gate array.

5. The system of claim 1 wherein said data processing circuitry comprises pattern recognition circuitry implemented in a pattern recognition application specific integrated circuit.

6. A data processing apparatus, comprising:
   an array of processing boards;
   a rear transition board coupled to each of the processing boards achieving time and regional multiplexing using board-to-board communication channels;
   at least one mezzanine card; and
   at least one through silicon via connecting said plurality of two dimensional pattern recognition integrated circuits configured on at least one of said mezzanine cards in order to provide pattern recognition associative memory for identifying patterns according to a 3D vertical integration.

7. The apparatus of claim 6, wherein the processing boards incorporate a full-mesh architecture permitting, inter-board communication and wherein said processing boards conform to advanced telecommunications computing architecture specification standards.

8. The apparatus of claim 6 further comprising a backplane configured to time-multiplex incoming data in a manner that manages input and output demands of the apparatus.

9. The apparatus of claim 6 wherein said at least one mezzanine card further comprises:
   a field programmable gate array;
   data processing circuitry; and
   a plurality of fiber optic transceivers.

10. The apparatus of claim 9 wherein said data processing circuitry comprises pattern recognition circuitry implemented in a field programmable gate array.

11. The apparatus of claim 9 wherein said data processing circuitry comprises pattern recognition circuitry implemented in a pattern recognition application specific integrated circuit.

12. A method for real time data processing, comprising:
    configuring an array of processing boards;
    coupling said array of processing boards in order to provide inter-board communication thereby achieving time and regional multiplexing using board-to-board communications channels; and
    identifying patterns according to a 3D vertical integration.

13. The method of claim 12 further comprising:
    connecting a plurality of two dimensional pattern recognition integrated circuits vertically with at least one through silicon via, on at least one of mezzanine card;
    connecting said mezzanine card to said array of processing boards; and
    coupling a rear transition board to each of the processing boards, said coupling and array achieving said time and regional multiplexing using board-to-board communications channels and 3D vertical integration.

14. The method of claim 12 further comprising:
time-multiplexing of incoming data in a manner that manages input and output demands with a backplane.

\* \* \* \* \*